US008139516B2

(12) United States Patent
Isozu et al.

(10) Patent No.: US 8,139,516 B2
(45) Date of Patent: Mar. 20, 2012

(54) WIRELESS COMMUNICATION TERMINAL, WIRELESS COMMUNICATION SYSTEM, COMMUNICATION MANAGEMENT METHOD AND COMPUTER PROGRAM

(75) Inventors: Masaaki Isozu, Tokyo (JP); Kazuhiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 12/328,636

(22) Filed: Dec. 4, 2008

(65) Prior Publication Data

US 2009/0207792 A1 Aug. 20, 2009

(30) Foreign Application Priority Data

Dec. 14, 2007 (JP) ................. P2007-323632

(51) Int. Cl.
- *H04H 20/71* (2008.01)
- *H04J 3/26* (2006.01)
- *H04L 12/56* (2006.01)
- *H04W 4/00* (2009.01)

(52) U.S. Cl. ........ 370/312; 370/349; 370/390; 370/432; 455/434

(58) Field of Classification Search .......... 370/310–350; 455/66.1, 67.7, 338, 411, 414.1, 416, 426.1, 455/428, 456.2, 466, 501, 504
See application file for complete search history.

(56) References Cited

U.S. PATENT DOCUMENTS

| | | | | |
|---|---|---|---|---|
| 6,625,652 | B1 * | 9/2003 | Miller et al. | 709/227 |
| 7,171,476 | B2 * | 1/2007 | Maeda et al. | 709/227 |
| 2003/0236860 | A1 * | 12/2003 | Yegin | 709/218 |
| 2004/0246903 | A1 * | 12/2004 | Huang et al. | 370/247 |
| 2004/0253970 | A1 * | 12/2004 | Kunihiro | 455/519 |
| 2005/0157661 | A1 | 7/2005 | Cho | |
| 2007/0268856 | A1 * | 11/2007 | Wijting et al. | 370/328 |
| 2008/0304408 | A1 * | 12/2008 | Kraemer et al. | 370/230 |

FOREIGN PATENT DOCUMENTS

| | | |
|---|---|---|
| JP | 2003-304572 | 10/2003 |
| JP | 2003-318917 | 11/2003 |
| JP | 2004-23790 | 1/2004 |
| JP | 2007-528619 | 10/2007 |

OTHER PUBLICATIONS

Henrik Lundgren et al., "Coping with Communication Gray Zones in IEEE 802.11b based on Ad hoc Networks". WoWMoM. Sep. 28, 2002, Atlanta, Georgia, U.S., ACM 1-58113-474-6/02-0009.

* cited by examiner

*Primary Examiner* — Tri H Phan
(74) *Attorney, Agent, or Firm* — Finnegan, Henderson, Farabow, Garrett & Dunner, L.L.P.

(57) ABSTRACT

A wireless communication terminal, which forms a wireless network with a plurality of other wireless communication terminals, includes a detection portion to detect a first communication management signal periodically transmitted via broadcast from another wireless communication terminal prior to communication of a data signal, a communication control portion to determine whether to transmit a second communication management signal to the wireless communication terminal to transmit the first communication management signal based on a detection status of the first communication management signal, and a wireless communication portion serving as a transmission portion to transmit the second communication management signal via unicast to the wireless communication terminal as a transmission source of the first communication management signal and as a reception portion to receive an acknowledge signal transmitted via unicast in response to the second communication management signal.

13 Claims, 14 Drawing Sheets

FIG.8

| TYPE | LENGTH |
|------|--------|
| VALUE ||

| ADDRESS | RSSI | RECEPTION RATE | | | | RECEPTION INTERVAL | TRANSMISSION RATE | RTT |
|---|---|---|---|---|---|---|---|---|
| | | H | S | M | L | | | |
| NODE B | 65 | 70 | 100 | 60 | 50 | 1.002sec | 11Mbps | 10ms |
| NODE C | 40 | 50 | 80 | 40 | 30 | 1.005sec | 11Mbps | 21ms |

181 182 183 184 185 186

WIRELESS COMMUNICATION TERMINAL, WIRELESS COMMUNICATION SYSTEM, COMMUNICATION MANAGEMENT METHOD AND COMPUTER PROGRAM

CROSS REFERENCES TO RELATED APPLICATIONS

The present invention contains subject matter related to Japanese Patent Application JP 2007-323632 filed in the Japan Patent Office on Dec. 14, 2007, the entire contents of which being incorporated herein by reference.

BACKGROUND OF THE INVENTION

1. Field of the Invention

The present invention relates to a wireless communication terminal that forms a mesh network with a plurality of wireless communication terminals, a wireless communication system, a communication management method and a computer program.

2. Description of the Related Art

A mesh network operates as a backbone that connects access points in a mesh architecture to autonomously form transmission paths, and its standardization is promoted by the groups such as Internet Engineering Task Force Mobile Ad hoc Network (IETF MANET) and IEEE 802.11s. However, there are many issues in implementation such as difficulty in measuring a link quality.

In the mesh network, a hello message, which is a communication management signal, is generally used to grasp the existence of nearby nodes. The hello message is transmitted via broadcast so that it reaches all nodes within the wireless communication range. FIG. 14 shows an example of the mesh network that is made up of three nodes A, B and C. It is assumed that all the nodes are in the state of being able to communicate. Each node periodically transmits a hello message to an indefinite number of nodes via broadcast. For example, if the nodes B and C receive the hello message that is transmitted from the node A, the nodes B and C register the node A on their nearby node lists as a node existing nearby and being able to communicate with. In this manner, the node that has received the hello message recognizes a transmission source node as a nearby node being able to communicate with.

SUMMARY OF THE INVENTION

However, it is difficult to grasp the existence of nearby nodes accurately with the hello message. This is due to the absence of an acknowledge signal (ACK) that is transmitted from a receiving end to a transmitting end so as to notify the correct receipt of data in a broadcast signal. Transmission of a signal via broadcast without ACK succeeds if the signal passes in the forward direction. On the other hand, transmission of a signal via unicast with ACK fails even if the signal passes in the forward direction, unless ACK passes in the reverse direction. Thus, in terms of a general network layer, the reachability of broadcast communication is lower than that of unicast communication. Further, a signal transmitted via broadcast is transmitted at a low transmission rate in some cases, and the reachability may vary due to a difference in the transmission rate. Therefore, even if a signal transmitted via broadcast can be communicated, a signal transmitted via unicast may not be communicated, and vice versa.

For example, it is assumed that the reachability of a signal transmitted via broadcast is higher than the reachability of a signal transmitted via unicast. In such a case, the node A shown in FIG. 14 exists inside an area 10 where a signal transmitted via broadcast reaches and outside an area 20 where a signal transmitted via unicast reaches. Thus, the node A exists in a gray zone 30 where a signal transmitted from the node B via broadcast can be received but a signal transmitted from the node B via unicast cannot be received. Therefore, while the node A can receive a hello message transmitted from the node B via broadcast, it may not be able to receive a data signal correctly (e.g. Henrik Lundgren and two others, "Coping with Communication Gray Zones in IEEE 802.11b based Ad hoc Networks" (United States), WoWMoM 2002, Sep. 28, 2002).

Further, because a control message such as a hello message is transmitted containing necessary information only, its packet size is usually smaller than a data packet that is normally used for communication. In a wireless network, a small packet tends to have a lower error probability than a large packet, thus having higher reachability. Accordingly, even if a receiving node can receive a hello message transmitted from a transmitting node, it may not be able to perform data communication.

To address such an issue, a wireless communication system that performs reliable broadcast communication by transmitting, via unicast, an acknowledge signal for confirming whether a signal has reached for every broadcast communication is disclosed in Japanese Unexamined Patent Application Publication No. 2003-318917. However, in such a wireless communication system, a wireless communication terminal to newly join a network cannot join the network unless the communication reachability is assured with all wireless communication terminals that already join the network, and there is lack of flexibility in network building.

In light of the foregoing, it is desirable to provide a novel and improved wireless communication terminal, a wireless communication system, a communication management method and a computer program capable of appropriately grasping the link state between nodes using communication management signals.

According to an embodiment of the present invention, there is provided a wireless communication terminal forming a wireless network with a plurality of other wireless communication terminals. The wireless communication terminal includes a detection portion to detect a first communication management signal periodically transmitted via broadcast from another wireless communication terminal prior to communication of a data signal, a communication control portion to determine whether to transmit a second communication management signal to the wireless communication terminal to transmit the first communication management signal based on a detection status of the first communication management signal, a transmission portion to transmit the second communication management signal via unicast to the wireless communication terminal as a transmission source of the first communication management signal, and a reception portion to receive an acknowledge signal in response to the second communication management signal transmitted via unicast.

According to the embodiment of the present invention, as a preliminary step toward data signal communication, the wireless communication terminal that has received the first communication management signal transmitted by broadcast communication transmits the second communication management signal by unicast communication to the wireless communication terminal that has transmitted the first communication management signal, and then receives the acknowledge signal in response to the second communication management signal from the wireless communication terminal that has received the second communication management signal. It is thereby possible to accurately grasp the link state between the wireless communication terminals using the first communication management signal transmitted via broadcast and the second communication management signal transmitted via unicast.

The wireless communication terminal may further include a candidate list generation portion to generate a candidate list for managing a destination of the second communication management signal. The candidate list generation portion sets a transmission source of the first communication management signal detected by the detection portion to the candidate list as a destination of the second communication management signal, and the transmission portion transmits the second communication management signal via unicast based on the candidate list.

If the first communication management signal is not received from one wireless communication terminal a prescribed number of times in succession, for example, the candidate list generation portion may exclude the wireless communication terminal from the candidate list. Further, the candidate list may hold a remaining period for a wireless communication terminal to remain set to the candidate list as the destination of the second communication management signal in association with the destination of the second communication management signal. In such a case, the candidate list generation portion may exclude the destination of the second communication management signal having the remaining period of zero from the candidate list. It is thereby possible to extract the wireless communication terminal with which communication is likely to be ensured.

The message length of the second communication management signal may be variable, and it may be composed of one or two or more signals with different sizes. If various sizes of communication management signals can be transmitted, it is possible to appropriately transmit and receive a data signal, which is performed after transmitting and receiving the communication management signals, based on the transmission state.

The wireless communication terminal may further include a transmission form determination portion to determine a transmission form of the second communication management signal. In such a case, the communication control portion may perform control to transmit the second communication management signal based on the transmission form determined by the transmission form determination portion if a plurality of destinations of the second communication management signal exist. For example, the transmission form determination portion may determine to transmit the second communication management signal on the size basis to the plurality of destinations, or may determine to transmit the second communication management signal on the wireless communication terminal basis to the plurality of destinations. Further, the transmission form determination portion may determine a priority of transmitting the second communication management signal to the wireless communication terminal as a destination of the second communication management signal based on a detection status of the first communication management signal.

Further, the acknowledge signal may contain a reception rate of the second communication management signal in another wireless communication terminal to transmit the acknowledge signal. In such a case, the communication control portion may perform communication of a data signal based on the reception rate of the second communication management signal. It is thereby possible to perform subsequent transmission and reception of a data signal by taking the reception rate of the communication management signal into account, thus enabling data signal communication according to the wireless status.

According to another embodiment of the present invention, there is provided a wireless communication system where a wireless network is formed by a plurality of wireless communication terminals. In the wireless communication system, one wireless communication terminal to periodically transmit a first communication management signal via broadcast prior to communication of a data signal includes a first communication management signal transmission portion to transmit the first communication management signal via broadcast, a second communication management signal reception portion to receive a second communication management signal from another wireless communication terminal having received the first communication management signal, and an acknowledge signal transmission portion to transmit an acknowledge signal via unicast in response to the second communication management signal to the wireless communication terminal as a transmission source of the second communication management signal. Further, another wireless communication terminal to receive the first communication management signal includes a detection portion to detect the first communication management signal, a communication control portion to determine whether to transmit the second communication management signal to the one wireless communication terminal based on a detection status of the first communication management signal, a second communication management signal transmission portion to transmit the second communication management signal via unicast to the one wireless communication terminal, and an acknowledge signal reception portion to receive an acknowledge signal from the one wireless communication terminal.

According to another embodiment of the present invention, there is provided a communication management method in a wireless communication system where a wireless network is formed by a plurality of wireless communication terminals. The communication management method includes the steps of transmitting a first communication management signal periodically via broadcast from each wireless communication terminal to another wireless communication terminal prior to communication of a data signal, transmitting a second communication management signal via unicast from the wireless communication terminal having received the first communication management signal based on a detection status of the first communication management signal, and transmitting an acknowledge signal via unicast from the wireless communication terminal having received the second communication management signal to the wireless communication terminal as a transmission source of the second communication management signal.

According to another embodiment of the present invention, there is provided a computer program causing a computer to function as the wireless communication terminal described above. The computer program is stored in a storage device included in the computer, and it is read by a CPU included in the computer and executed, thereby causing the computer to function as the wireless communication terminal. There is also provided a computer readable recording medium in which the computer program is stored. The recording medium may be a magnetic disk, an optical disk and so on, for example.

According to the embodiments of the present invention, it is possible to provide a wireless communication terminal, a wireless communication system, a communication management method and a computer program capable of appropriately grasping the link state between nodes using communication management signals.

BRIEF DESCRIPTION OF THE DRAWINGS

FIG. 8 is an explanatory view showing an example of a message body in FIG. 4.

FIG. 13 is an explanatory view showing an example of a nearby node list after receiving a unicast hello ACK message.

DETAILED DESCRIPTION OF THE PREFERRED EMBODIMENTS

Figure 1:
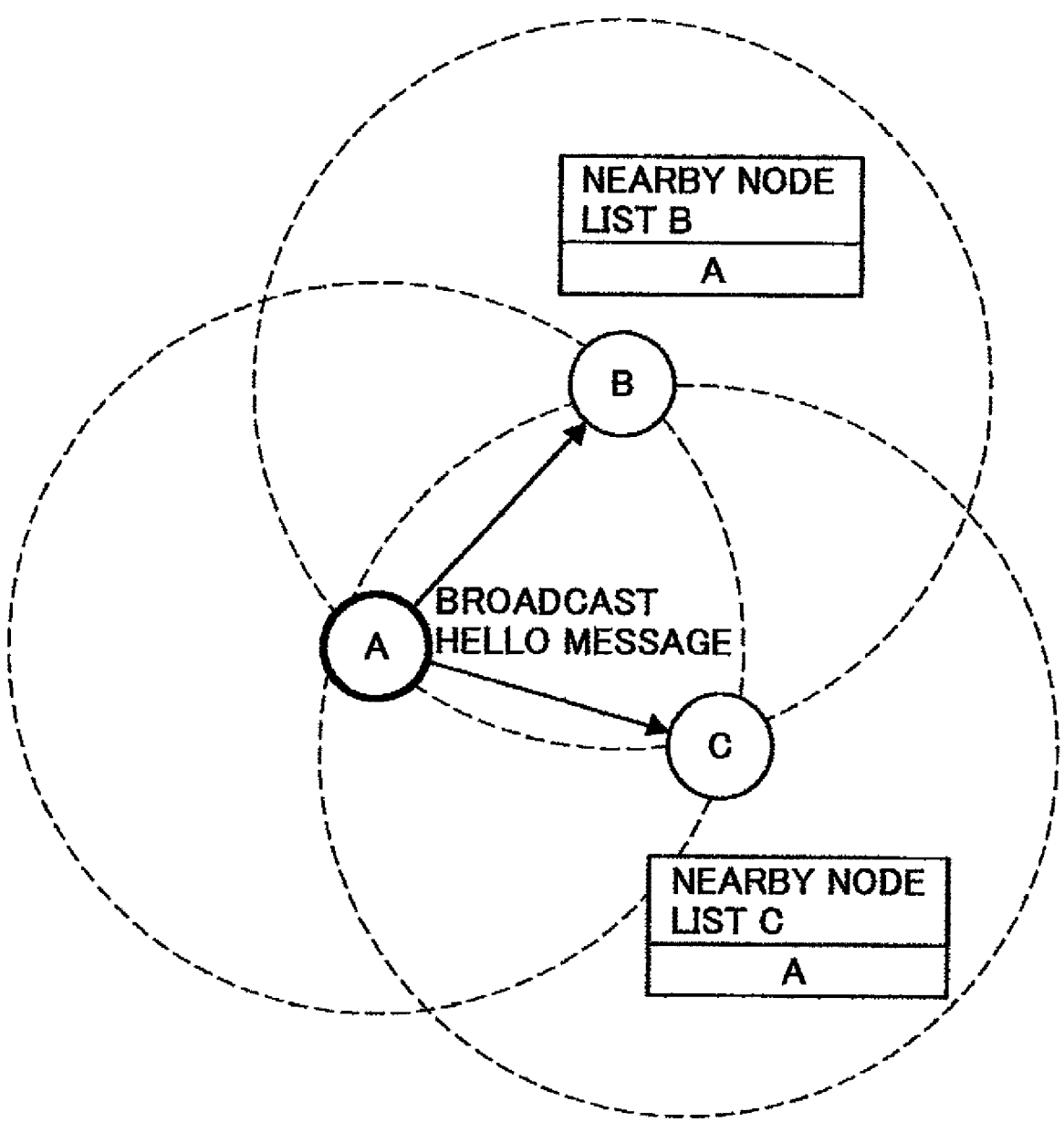
FIG. 1 is an explanatory view showing the configuration of a wireless network according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
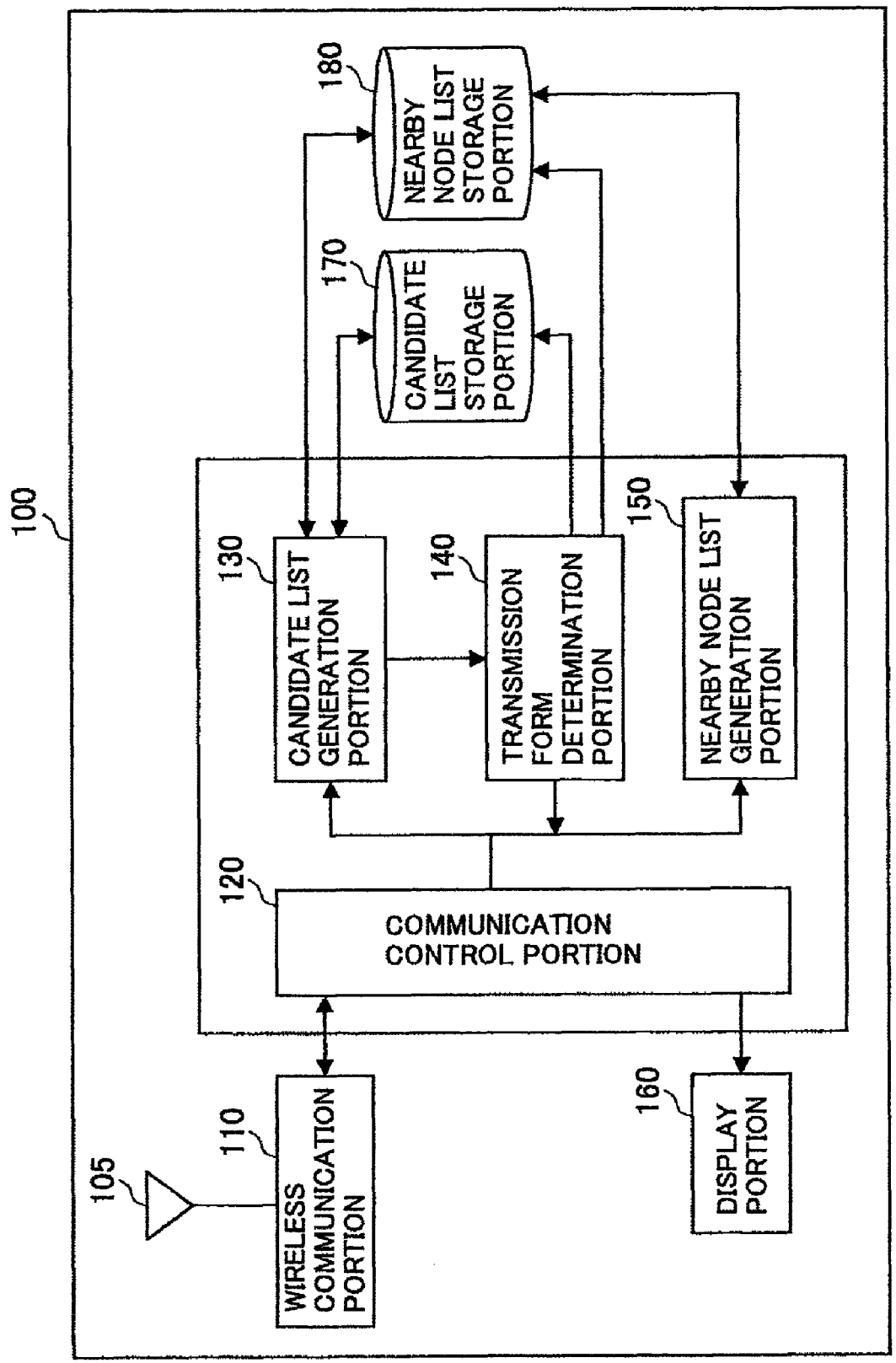
FIG. 2 is a block diagram showing the configuration of a wireless communication terminal according to the embodiment.

Referring first to FIGS. 1 and 2, a wireless network according to an embodiment of the present invention is described hereinafter. FIG. 1 is an explanatory view showing the configuration of the wireless network according to the embodiment. FIG. 2 is a block diagram showing the configuration of a wireless communication terminal 100 according to the embodiment.
<Configuration of a Wireless Network>

The wireless network according to the embodiment is a mesh network that is made up of three nodes: a node A, a node B and a node C, for example, as shown in FIG. 1. The node may be a wireless communication terminal, for example, and each node transmits a hello message by broadcast communication at regular intervals. In this embodiment, each node is described as being a wireless communication terminal.
<Configuration of a Wireless Communication Terminal>

The wireless communication terminal 100 according to the embodiment includes a wireless communication portion 110, a communication control portion 120, a candidate list generation portion 130, a transmission form determination portion 140, a nearby node list generation portion 150, a display portion 160, a candidate list storage portion 170, and a nearby node list storage portion 180, as shown in FIG. 2.

The wireless communication portion 110 is a functional portion that performs wireless communication with another wireless communication terminal 100 via an antenna 105. The wireless communication portion 110 transmits a hello message, which is a communication management signal, by broadcast communication as a first step, and then receives a hello message transmitted via unicast from another wireless communication terminal 100 as a second step, for example, as described in detail later. Further, the wireless communication portion 110 transmits an acknowledge signal ACK by unicast communication to the wireless communication terminal 100 that has transmitted the hello message by unicast communication.

The communication control portion 120 is a control portion that controls processing for determining whether or not to transmit a hello message via unicast to another wireless communication terminal 100 that is a transmission source of a hello message transmitted via broadcast according to the detection status of the hello message transmitted via broadcast from the wireless communication terminal 100. The communication control portion 120 controls the candidate list generation portion 130, the transmission form determination portion 140 and the nearby node list generation portion 150, which are described later, and determines transmission of a hello message by unicast communication. The communication control portion 120 further performs control processing to display the communication state between the wireless communication terminals 100 on the display portion 160 so as to provide the communication state with another wireless communication terminal 100 to a user.

The candidate list generation portion 130 is a functional portion that generates a candidate list indicating a candidate of the wireless communication terminal 100 to which a hello message is to be transmitted by unicast communication. The candidate list generation portion 130 generates the candidate list based on the detection status of the hello message transmitted by broadcast communication from another wireless communication terminal 100 and received by the wireless communication portion 110. Further, the candidate list generation portion 130 stores the generated candidate list into the candidate list storage portion 170, which is described later, and updates the candidate list stored in the candidate list storage portion 170 when a candidate list is newly generated.

The transmission form determination portion 140 is a functional portion that determines the transmission form of a hello message to be transmitted by unicast communication. The transmission form determination portion 140 determines the transmission form of a hello message to be transmitted to another wireless communication terminal 100 upon receiving notification that the candidate list is generated from the candidate list generation portion 130. In this embodiment, the message length of a hello message is variable. Thus, the wireless communication terminal 100 changes the message length of a hello message according to the communication status between the wireless communication terminals 100 or determines the order of transmitting hello messages when transmitting the hello messages to a plurality of wireless communication terminals 100, for example. The transmission form of a hello message that is determined by the transmission form determination portion 140 is transmitted to the communication control portion 120.

The nearby node list generation portion 150 is a functional portion that generates a list indicating other wireless communication terminals 100 which exist in the nearby area and can communicate with the wireless communication terminal 100 of its own. The nearby node list is a list that indicates the wireless communication terminals which are recognized that wireless communication is established. The wireless communication terminal 100 transmits a data signal based on the nearby node list. If ACK to the hello message that has been transmitted there from by unicast communication is received by the wireless communication portion 110, the nearby node list generation portion 150 stores the wireless communication terminal 100 that is the transmission source of the ACK onto the nearby node list in the nearby node list storage portion 180.

The display portion 160 displays the lists stored in the candidate list storage portion 170 and the nearby node list storage portion 180, for example. The display portion 160 may be a display or the like. The wireless communication terminal 100 according to the embodiment may not include the display portion 160.

The candidate list storage portion 170 is a storage portion that stores the candidate list, and it includes memory such as RAM and a hard disk. The candidate list storage portion 170 stores the candidate list that contains the address of the wireless communication terminal 100 that is the transmission source of the received hello message transmitted by broadcast communication, a lifetime and so on, for example.

The nearby node list storage portion 180 is a storage portion that stores the nearby node list, and it includes memory such as RAM and a hard disk. The nearby node list that is stored in the nearby node list storage portion 180 contains information such as the address of the wireless communication terminal 100 with which wireless communication is established and the reception rate of a hello message.

Figure 3:
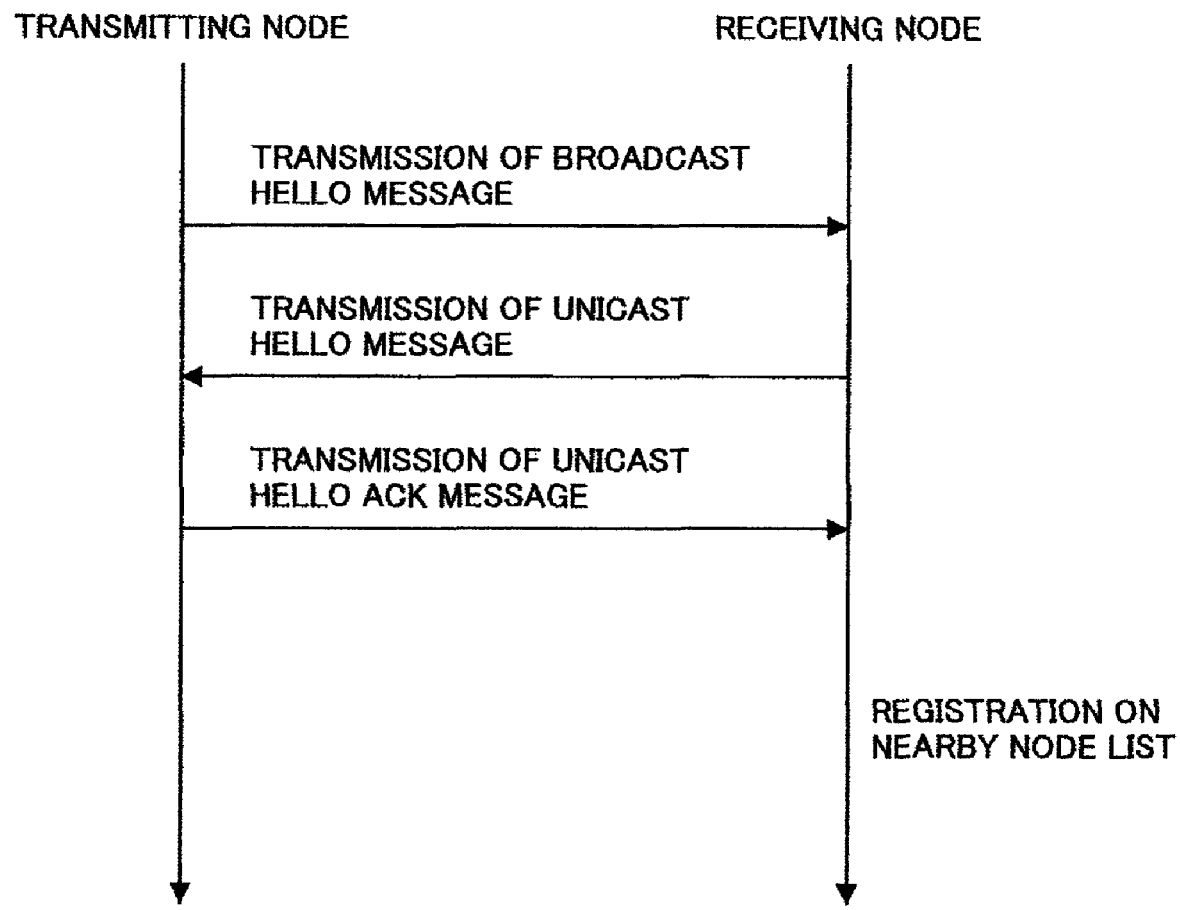
FIG. 3 is an explanatory view showing processing to establish communication in a wireless network according to the embodiment.

In the wireless network that includes the above-described wireless communication terminals 100, a hello message is generally used for searching the nearby area. However, there is a possibility that a data signal to be transmitted during a data transfer period after transmission of a communication management signal that is used for control to establish communication would not reach due to a difference in the reachability of signals between broadcast communication and unicast communication as described earlier. In light of this, in the wireless network according to the embodiment, three steps are performed as shown in FIG. 3 to determine whether suitable wireless communication is possible or not. Specifically, after a receiving node receives a hello message that is transmitted by broadcast communication from a transmitting node as the first step, the receiving node transmits a hello message by unicast communication to the transmitting node as the second step, and then the receiving node receives ACK that is transmitted by unicast communication from the transmitting node as the third step.

A communication management method of a wireless communication system in which the wireless network according to the embodiment is formed is described hereinafter. In the following description, a hello message, which is a communication management signal, that is transmitted by broadcast communication is referred to as a "broadcast hello message", a hello message that is transmitted by unicast communication is referred to as a "unicast hello message", and an acknowledge signal in response to the unicast hello message is referred to as a "unicast hello ACK message". Further, a node that transmits the broadcast hello message is referred to as a transmitting node, and a node that receives the broadcast hello message is referred to as a receiving node.

<First Step>

Figure 4:
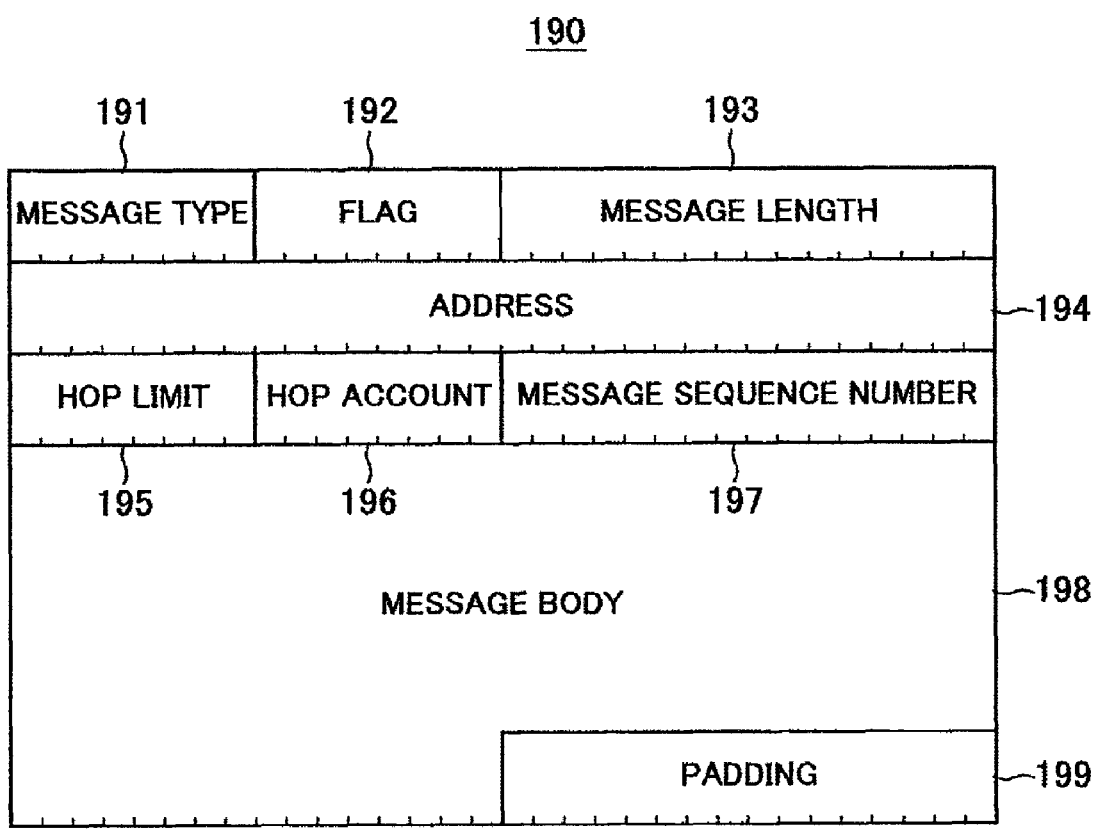
FIG. 4 is an explanatory view showing an example of a message format of a hello message according to the embodiment.

In the communication management method of the wireless communication system according to the embodiment, a broadcast hello message is transmitted as the first step in the same way as a communication establishment process in a normal wireless network. A typical message format of a hello message contains information such as a message type 191, a flag 192, a message length 193, an address 194, a hop limit 195, a hop account 196, a message sequence number 197, a message body 198 and a padding 199, as shown in FIG. 4. For example, a hello message in which the message type 191 indicating a transmission form is "broadcast hello", the address 194 indicating the transmission source of the message is its own address, and the hop limit 195 regulating the number of nodes to transfer is ".1" can be treated as a broadcast hello message.

The transmitting node to transmit a broadcast hello message periodically transmits the broadcast hello message at a communication management interval. The communication management interval is set to about 100 milliseconds to 1 second. A shorter communication management interval increases the accuracy of determination as to the existence of a link while it increases the load of the network at the same time. On the other hand, a longer communication management interval reduces the load of the network to offer advantages such as a decrease in power consumption of a node while it degrades the response of determination as to the existence of a link. The communication management interval may be variable according to the number of surrounding nodes or the congestion of the network.

Figure 5:
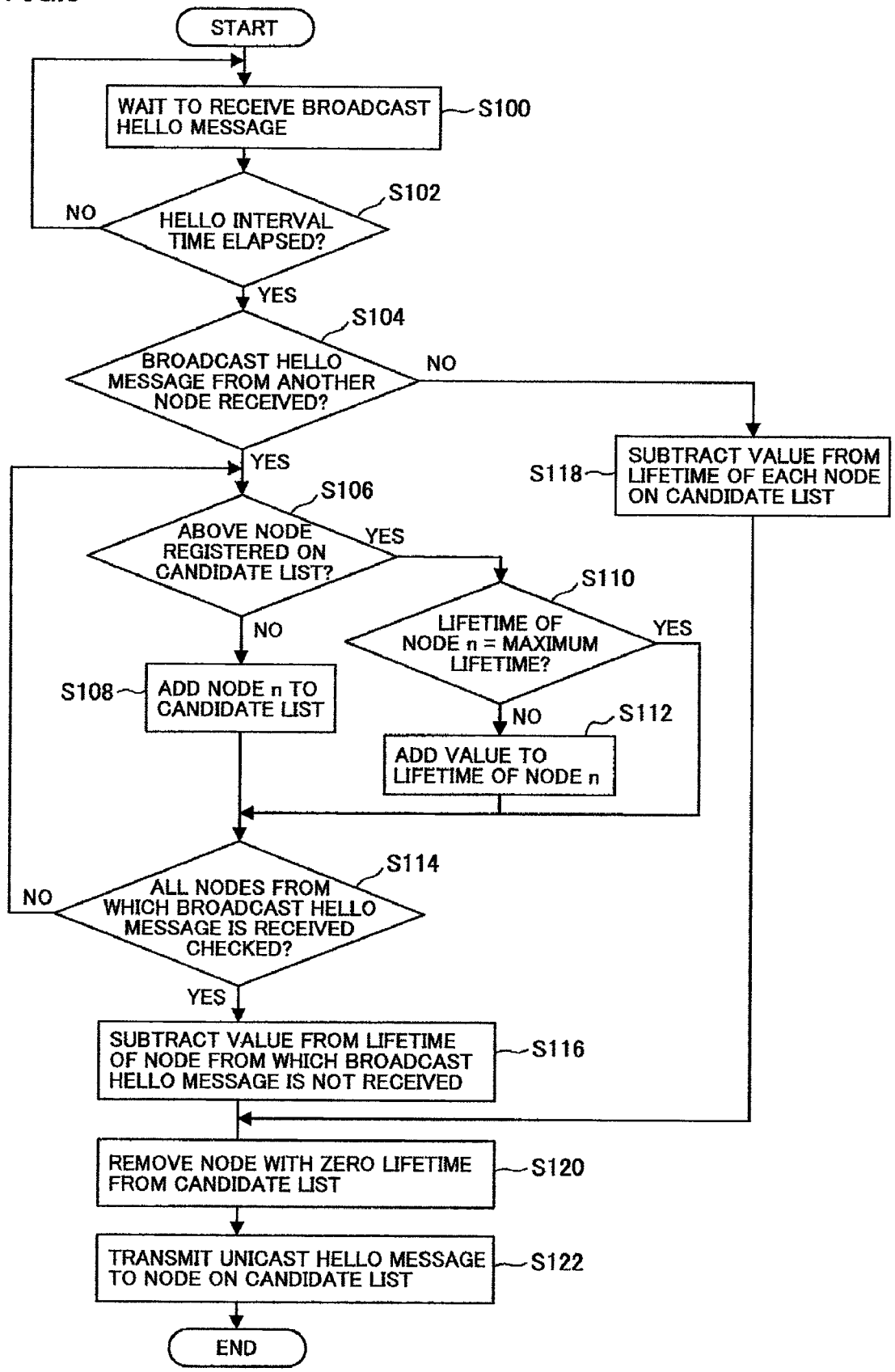
FIG. 5 is a flowchart showing processing in a receiving node to receive a broadcast hello message according to the embodiment.

On the other hand, the receiving node to receive the broadcast hello message performs processing according to the flowchart shown in FIG. 5. The receiving node to receive the broadcast hello message accepts the broadcast hello message from the surroundings during the communication management interval (S100). The receiving node checks whether a set time period of the communication management interval has elapsed (S102) and waits to receive the broadcast hello message until the communication management interval elapses. When the communication management interval has elapsed, the receiving node checks whether it has received the broadcast hello message from the transmitting node (S104).

If the receiving node has received the broadcast hello message transmitted from the transmitting node, the receiving node checks whether the transmitting node of the received broadcast hello message is stored on the candidate list by referring to the candidate list storage portion 170 that stores a candidate node to which a unicast hello message is to be transmitted (S106). If the transmitting node of the broadcast hello message is not stored on the candidate list, the receiving node adds the above transmitting node to the candidate list (S108). The candidate list stores information (e.g. address etc.) that identifies the transmitting node of the broadcast hello message, a lifetime that indicates a remaining period of registration onto the candidate list and so on, for example.

The lifetime is information that indicates whether or not to maintain registration on the candidate list as a target to transmit a unicast hello message. In this embodiment, the lifetime corresponds to the communication management interval, and one life time equals one communication management interval. In this embodiment, when a node is newly registered onto the candidate list, a maximum lifetime is assigned to the node. The maximum lifetime is "2", for example. If the broadcast hello message from the node registered on the candidate list is received in the next communication management interval, the lifetime of that node is added by 1. In the case where the current lifetime is equal to the maximum lifetime, the value may be maintained. If, on the other hand, the broadcast hello message from the node registered on the candidate list is not received in the next communication management interval, the lifetime of that node is subtracted by 1. Such processing is performed in each communication management interval, and when the lifetime of the node registered on the candidate list becomes zero, that node is removed from the candidate list.

In this manner, it is determined that the reachability of a message is low for the node from which the broadcast hello message is not received for a certain period of time, and such a node is excluded from a target to transmit a unicast hello message. It is thereby possible to extract the node with which wireless communication is likely to be ensured.

In the step S108 of FIG. 5, the node is newly added to the candidate list, and the maximum lifetime is set to the lifetime of the new node. On the other hand, if the transmitting node of the broadcast hello message is stored on the candidate list in the step S106, it is checked whether the lifetime of the transmitting node registered on the candidate list is currently equal to the maximum lifetime (S110). If the lifetime of the transmitting node is equal to the maximum lifetime in the step S110, the process proceeds to the next processing without changing the lifetime. If, on the other hand, the lifetime of the transmitting node is smaller than the maximum lifetime, the lifetime is added (S112). In this embodiment, the lifetime is added one by one.

After that, it is checked whether information on the candidate list is updated for all the nodes from which the broadcast hello message is received (S114). If there is another node from which the broadcast hello message is received, the receiving node repeats the processing from the step S106. If, on the other hand, information on the candidate list is updated for all the nodes from which the broadcast hello message is received, the lifetime of the node which is currently registered on the candidate list but from which the broadcast hello message is not received during the current communication management interval is subtracted (S116). In this embodiment, the lifetime is subtracted one by one.

Returning to the step S104, if the receiving mode does not receive any broadcast hello message from another transmitting node, the lifetime of each node recorded on the current candidate list is subtracted (S118). In the step S118, like the step S116, the lifetime is subtracted one by one.

After the new registration of the node onto the candidate list and the update of the lifetime are completed, the node on the candidate list that has zero lifetime is removed from the candidate list (S120). The zero lifetime means that the broadcast hello message transmitted from the node with zero lifetime is not received for a certain period of time. It is difficult to establish wireless communication with such a node, and even if wireless communication is established, signal reachability is expected to be low. Thus, information of such a node is removed from the candidate list, so that such a node is excluded from a target to transmit a unicast hello message. The update of the candidate list thereby ends.

Figure 6:
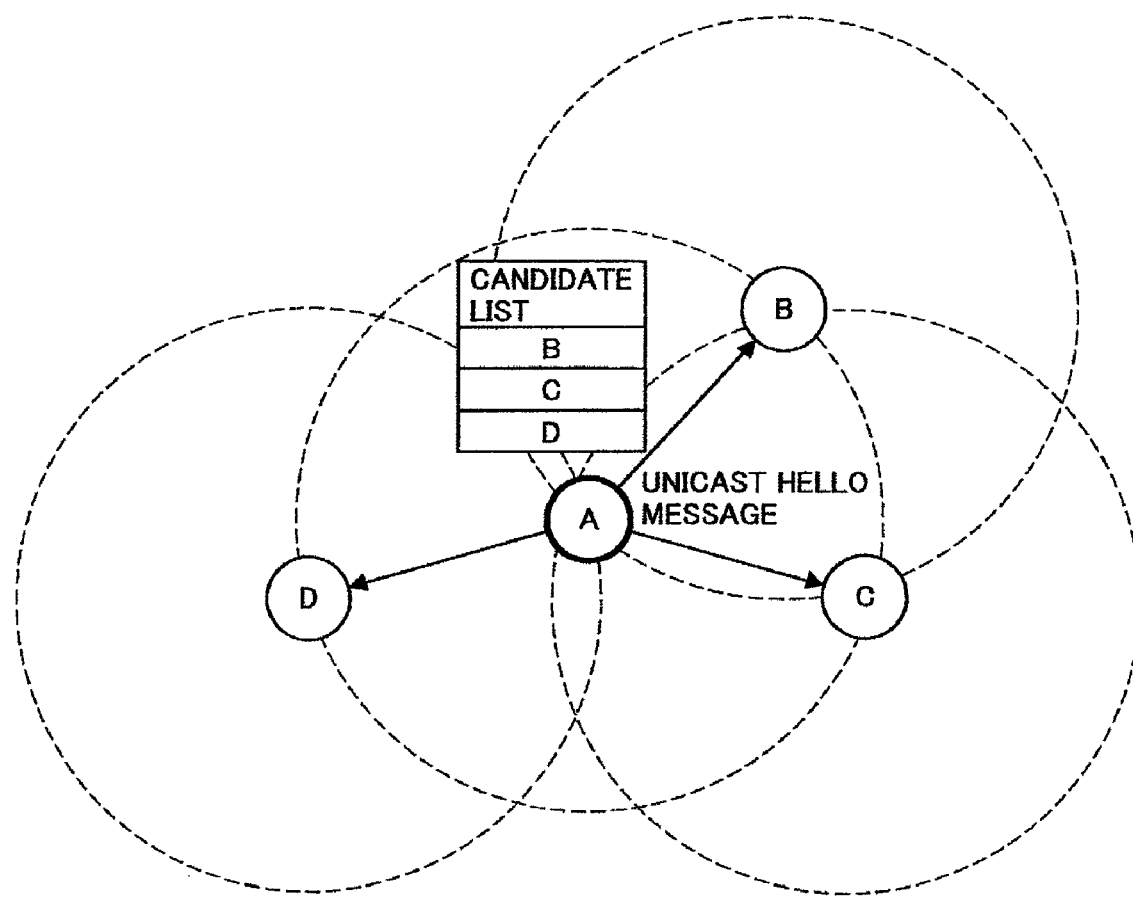
FIG. 6 is an explanatory view showing the configuration of a wireless network in the state where a unicast hello message is transmitted based on a candidate list in which a receiving node is updated.

Then, the receiving node transmits a unicast hello message based on the updated candidate list (S122). In this embodiment, the unicast hello message is transmitted to all the nodes registered on the updated candidate list. For example, in the case where the nodes B, C and D are registered on the candidate list of the node A that has received the broadcast hello message, the node A transmits the unicast hello message to the nodes B, C and D as shown in FIG. 6.

Figure 7:
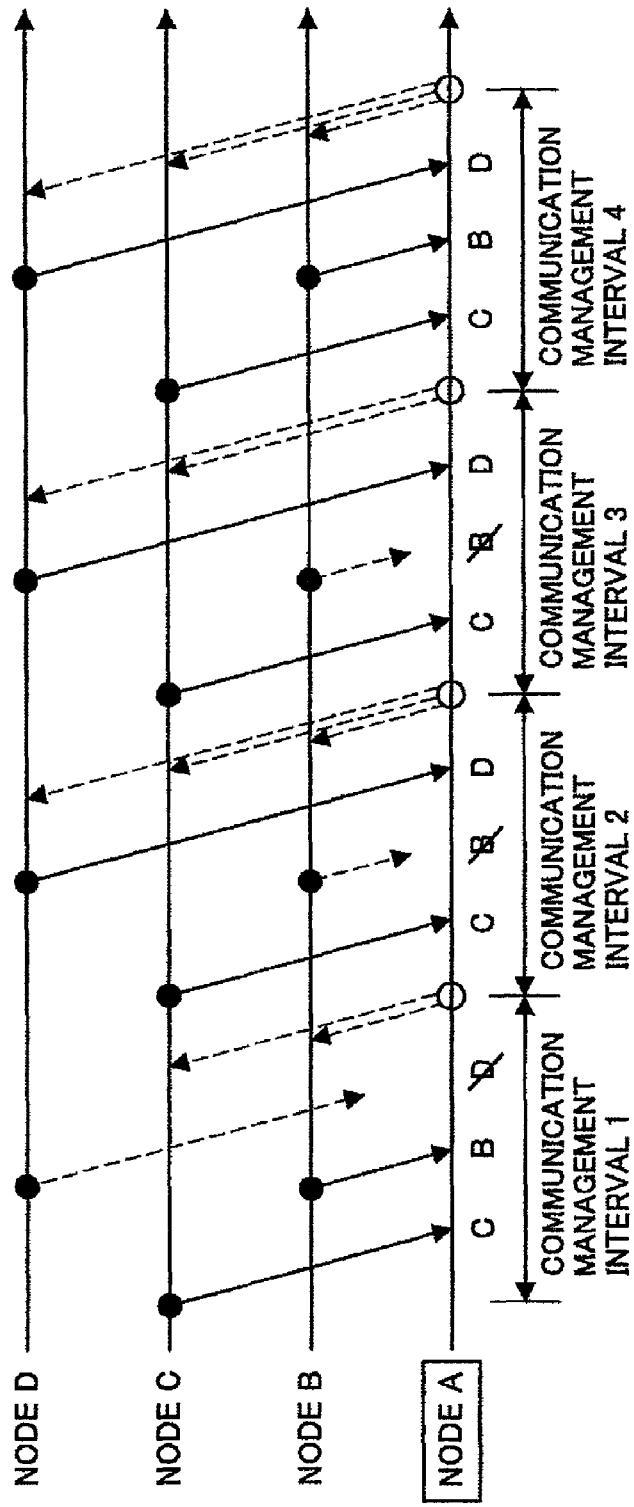
FIG. 7 is an explanatory view showing an example of processing in the receiving node to receive a broadcast hello message shown in FIG. 5.

The processing in the receiving node of the broadcast hello message is described above. The specific processing in the receiving node of the broadcast hello message is described hereinafter with reference to FIG. 7. FIG. 7 is an explanatory view showing an example of the processing in the receiving node of the broadcast hello message shown in FIG. 5. Referring to FIG. 7, the node A is the receiving node to receive the broadcast hello message, and the nodes B, C and D are the transmitting nodes to transmit the broadcast hello message. In the following description, the maximum lifetime is 2 as an example.

During the first communication management interval, it is assumed that the node A has received the broadcast hello messages transmitted from the node B and the node C but has not received the broadcast hello message transmitted from the node D. In such a case, the node B and the node C are newly registered onto the candidate list of the node A, and the value "2" is set to the lifetime of each node. On the other hand, the node D from which the broadcast hello message has not been received is not registered onto the candidate list. The candidate list 1 shown in FIG. 7 is thereby generated, and then the node A transmits the unicast hello message to the node B and the node C that are registered on the candidate list 1.

Next, in the second communication management interval, it is assumed that the node A has received the broadcast hello messages transmitted from the node C and the node D but has not received the broadcast hello message transmitted from the node B. In such a case, the node D is newly registered onto the candidate list, and the value "2" is set to the lifetime of the node D. Further, because the node C is already registered on the candidate list and its lifetime equals the maximum lifetime, it remains registered on the candidate list without any change. On the other hand, because the broadcast hello message from the node B has not been received by the node A during the second communication management interval, the lifetime of the node B on the candidate list is subtracted by 1. On the candidate list 2 that is thereby generated, a node whose lifetime has become zero during the second communication management interval does not exist, and thus the nodes B, C and D are not removed from the candidate list. Therefore, the node A transmits the unicast hello message to the nodes B, C and D.

Then, during the third communication management interval, it is assumed that the node A has received the broadcast hello messages transmitted from the node C and the node D but has not received the broadcast hello message transmitted from the node B, just like during the second communication management interval. In such a case, because the node C and the node D are already registered on the candidate list and their lifetime equals the maximum lifetime, they remain registered on the candidate list without any change. On the other hand, because the broadcast hello message from the node B has not been received by the node A during the third communication management interval, the lifetime of the node B on the candidate list is subtracted by 1. As a result, the lifetime of the node B becomes zero, and thus the node B is removed from the candidate list. Therefore, the node A transmits the unicast hello message to the node C and the node D that are registered on the generated candidate list 3.

After that, during the fourth communication management interval, it is assumed that the node A has received the broadcast hello messages transmitted from the nodes B, C and D. In such a case, because the node C and the node D are already registered on the candidate list and their lifetime equals the maximum lifetime, they remain registered on the candidate list without any change. On the other hand, because the node B is not registered on the candidate list, it is newly registered onto the candidate list, and the value "2" is set to the lifetime of the node B. The candidate list 4 is thereby generated, and the node A transmits the unicast hello message to the nodes B, C and D that are registered on the candidate list 4.

In this manner, by determining whether to transmit the unicast hello message according to the conditions of receiving the broadcast hello message, it is possible to transmit the unicast hello message to only the node with which communication would be ensured.

<Second Step>

Figure 8:
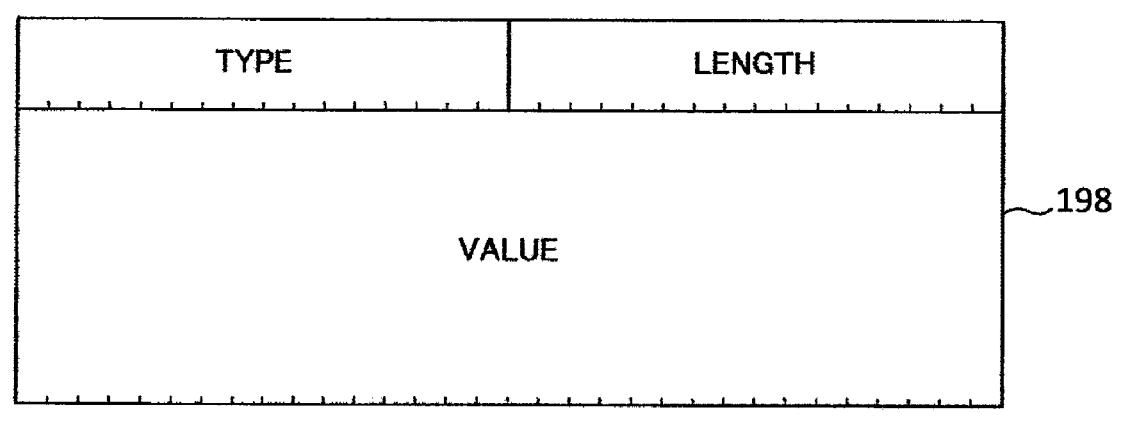
Figure 9:
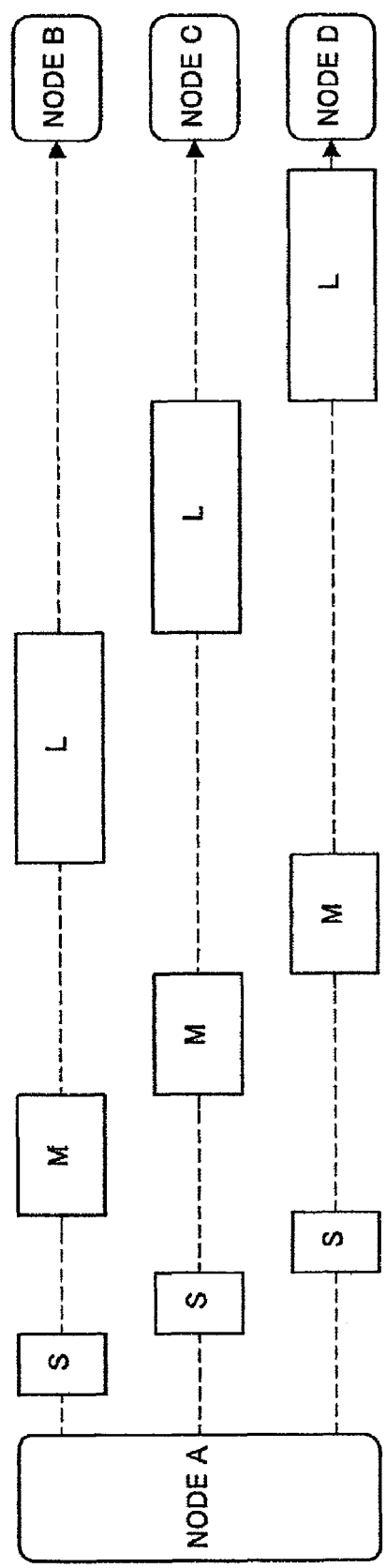
FIG. 9 is an explanatory view showing an example of a method of transmitting a unicast hello message according to the embodiment.
Figure 10:
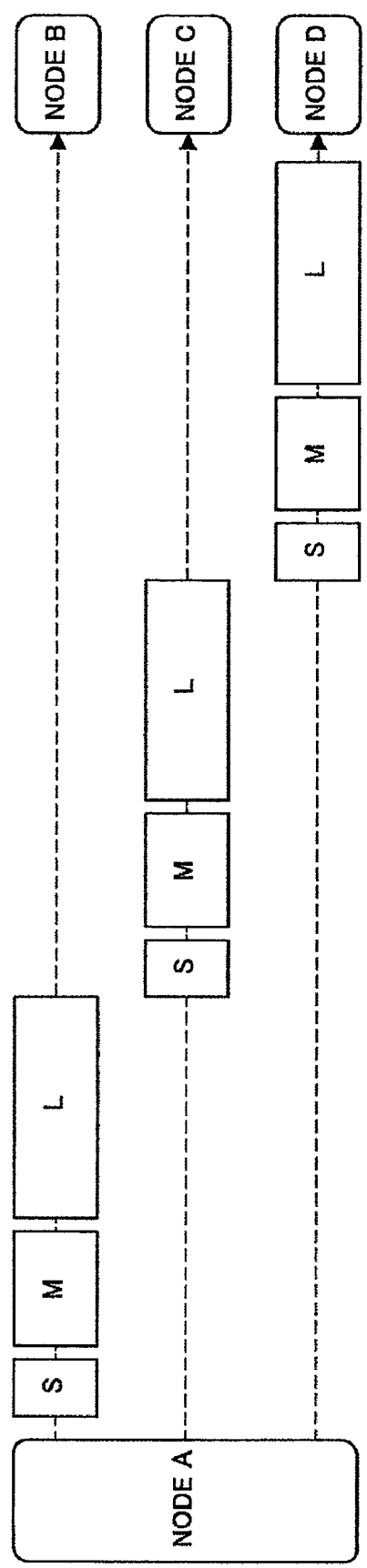
FIG. 10 is an explanatory view showing another example of a method of transmitting a unicast hello message according to the embodiment.

In the communication management method of the wireless communication system according to the embodiment, the receiving node transmits a hello message by unicast communication to the transmitting node as the second step. The processing in the second step is described hereinafter with reference to FIGS. 8 to 10. FIG. 8 is an explanatory view showing an example of a message body in FIG. 4. FIG. 9 is an explanatory view showing an example of a method of transmitting a unicast hello message according to the embodiment. FIG. 10 is an explanatory view showing another example of a method of transmitting a unicast hello message according to the embodiment.

The receiving node that has received the broadcast hello message transmits a unicast hello message based on the candidate list that is generated by the process of FIG. 5. The unicast hello message may also have a typical format as shown in FIG. 4. For example, a hello message in which the message type 191 is "unicast hello", the address 194 indicating the transmission source of the message is its own address, and the hop limit 195 is "1" can be treated as a unicast hello message.

Further, in the message body 198, necessary numbers may be set in a Type-Length-Value (TLV) format as shown in FIG. 8. The values to be set in the TLV format may include a transmission rate (integer), a hello message length (integer), a hello transmission time (time), a hello reception interval (integer), a hello reception rate (floating point number) and so on. The transmission rate is the rate of PHY media, and a value such as 11 Mbps or 54 Mbps is set, for example. The hello message length is a variable length of a hello message. The hello transmission time is used to measure a link round-trip time of a hello message and a hello ACK message. The hello reception interval is a time interval of an actually received hello message, and it is notified to the surroundings according to need, including jitter. The hello reception rate is a reception success rate of a hello message with a target node. Those values that are set in the TLV format are applicable in a unicast hello ACK message, which is described later.

The case where the receiving node A transmits the unicast hello message to the surrounding transmitting nodes B, C and D as shown in FIG. 6 is described hereinafter. A common hello message has a fixed message size and is transmitted at regular time intervals. Further, because a control message such as the hello message is usually transmitted with a minimum size, the signal reachability is high and it is thus likely to fail to determine the wireless status accurately. On the other hand, according to the embodiment of the present invention, a hello message length is altered by assuming various applications and wireless status, and it is transmitted several times in one set.

In this embodiment, a method of transmitting three kinds of unicast hello messages to the node registered on the candidate list is employed. Although three kinds, i.e. 128 bytes (S), 512 bytes (M) and 1500 bytes (L), are defined as the size of the unicast hello message in the following example, the present invention is not limited to such an example, and a hello message length may be altered on the assumption of applications and wireless status.

If there is a plurality of transmitting nodes to which the unicast hello message is to be transmitted, the order of transmitting the unicast hello message can be also altered as appropriate depending on wireless status or the like. For example, as a first pattern, the unicast hello message may be transmitted to each node sequentially from small-size signals as shown in FIG. 9. In the first pattern, the receiving node A to transmit the unicast hello message first transmits the signals of a small size (S) to the nodes B, C and D. Next, the node A transmits the signals of an intermediate size (M) to the nodes B, C and D. Further, the node A transmits the signals of a large size (L) to the nodes B, C and D. In the first pattern, by transmitting signals on the size basis to the transmitting nodes to which the unicast hello message is to be transmitted, it is possible to transmit the signals equally.

Alternatively, as a second pattern, signals of three sizes may be transmitted on the node basis as shown in FIG. 10, for example. In the second pattern shown in FIG. 10, the node A first transmits the signals of three sizes (S, M, L) to the node B. Next, the node A transmits the signals of three sizes to the node C, and further transmits the signals of three sizes to the node D. Because the signals are transmitted on the node basis in the second pattern, if the number of nodes to which the unicast hello message is to be transmitted is large, it may be difficult to make an equal evaluation between the node to which the unicast hello message is transmitted firstly and the node to which the unicast hello message is transmitted lastly. However, the second pattern is effective in the case where the processing is performed on the node basis, such as when transmitting the unicast hello message sequentially from the node with a high priority for establishing communication, for example.

Further, as a third pattern, signals of random sizes may be transmitted to destination nodes in a predetermined order. Specifically, when transmitting signals from the node A as a transmission source to the nodes B, C and D as destinations, the signals are transmitted to the nodes in the order of the node B, the node C, the node D, the node B, and so on. On the other hand, the sizes of the transmitted signals may be in the order of S (node B), M (node C), L (node D), M (node B), L (node C), S (node D), L (node B), S (node C), M (node D) and so on. The node in parentheses indicates a destination node to which the unicast hello message is transmitted from the node A.

The third pattern is effective when wireless congestion varies with time, for example. Generally, transmission of a signal of the size S is likely to be successful compared with a signal of the size L in the less wirelessly congested state. However, if, accidentally, the wireless network becomes congested during transmitting the size S and the congestion is eased at the time of transmitting the size L, the transmission success rate may be reversed. To avoid this, the third pattern shifts the time axis by randomizing the order of the sizes of signals to be transmitted to the destination nodes, thereby reducing variation of the transmission success rate due to a change in wireless congestion.

Furthermore, as other patterns, messages may be transmitted by randomizing the order of nodes to which the unicast hello message is to be transmitted, in addition to the order of message sizes, or, messages may be transmitted by setting the order of nodes based on a certain measured numerical value such as a link quality.

The processing in the receiving node that transmits the unicast hello message is described in the foregoing. The transmitting node that has received the unicast hello message, on the other hand, summarizes statistical information related to the transmission source node that is contained in the unicast hello message. The unicast hello message contains a sequence number. Based on such information, the transmitting node that has received the unicast hello message can calculate the number of packets that are lost in the wireless interval between the previously received unicast hello message and the currently received unicast hello message.

Further, the transmitting node may calculate the reception rate of the unicast hello message at a prescribed interval when the communication management interval during which the unicast hello message is transmitted elapses several times. The average $P_h$ of the reception rate of the unicast hello message with a size X (which is referred to hereinafter as the "hello reception rate") is represented by the following Expression 1, taking weights into account. P indicates the reception rate of the unicast hello message, and w indicates the weights to each message. The subscripts s, m and l indicate a message size.

$$P_h = \frac{P_s \times w_s + P_m \times w_m + P_l \times w_l}{w_s + w_m + w_l}. \qquad \text{Expression 1}$$

In the above Expression 1, the weights w are normally set equally (e.g. $w_s=w_m=w_l=1$). However, in the case where large-size packets are frequently transmitted and received as applications such as a real-time stream, it may be set to place a greater importance on the weight $w_l$ to the large-size packet. On the other hand, in the case where small-size packets are frequently transmitted and received such as a sensor network, it may be set to place a greater importance on the weight $w_s$ to the small-size packet.

<Third Step>

Figure 11:
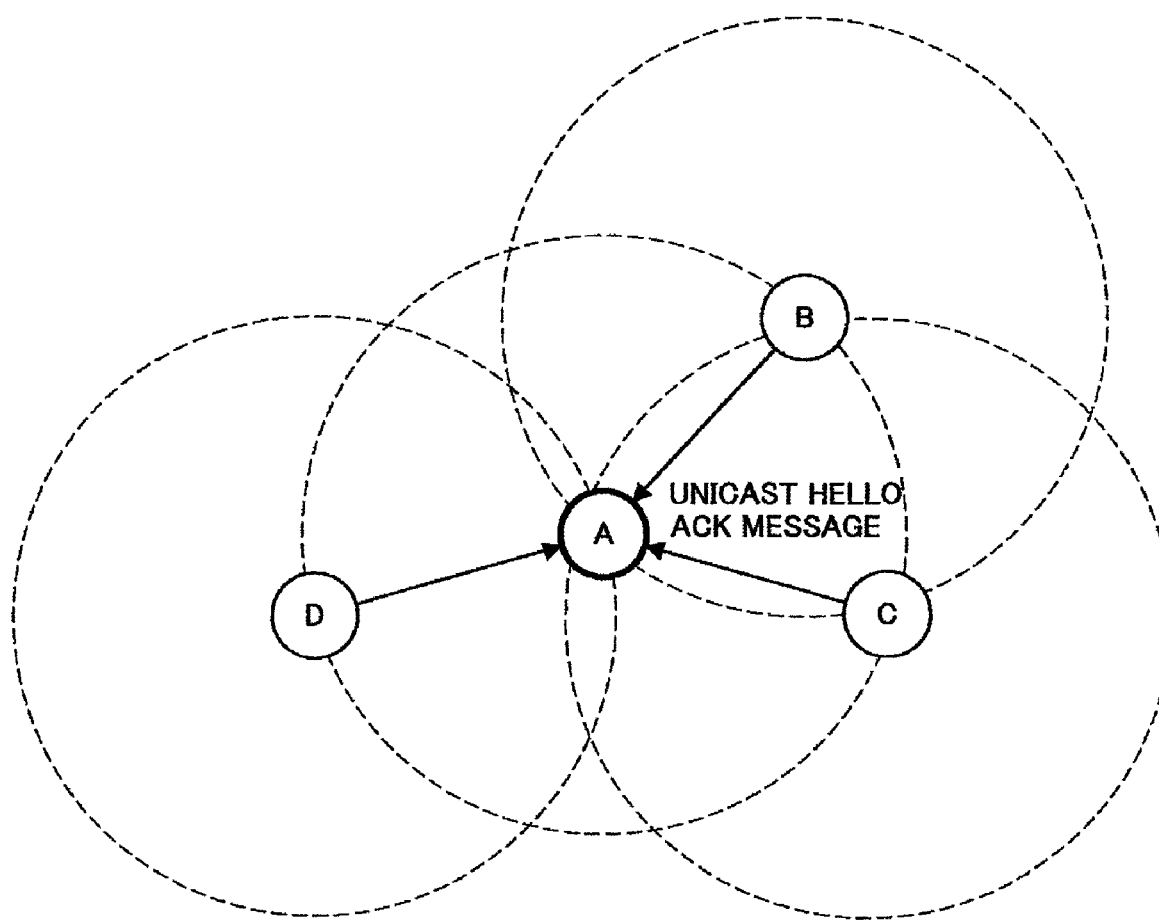
FIG. 11 is an explanatory view showing the configuration of a wireless network in the third step.
Figure 12:
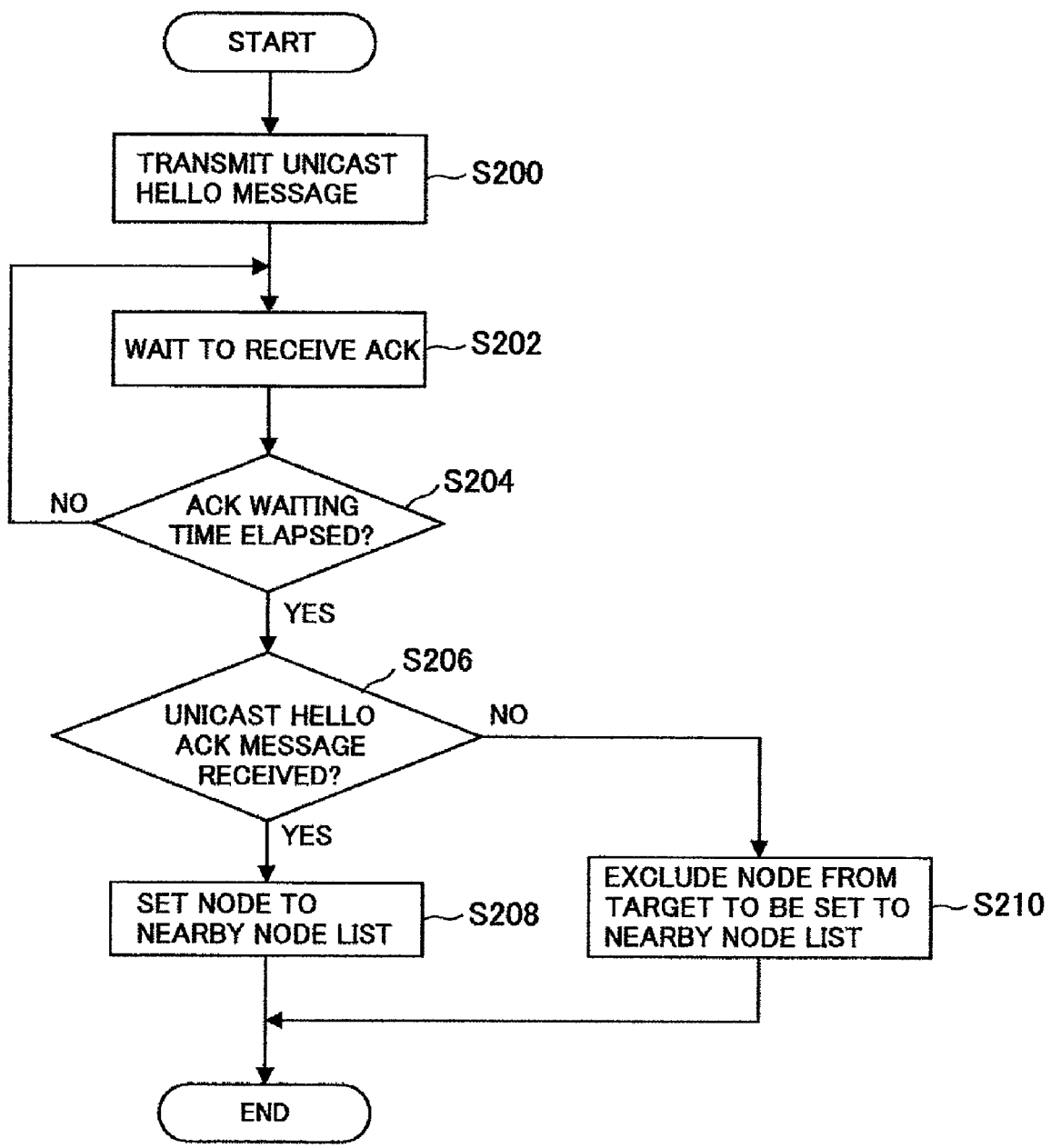
FIG. 12 is a flowchart showing processing in a receiving node to receive a unicast hello ACK message.
Figure 14:
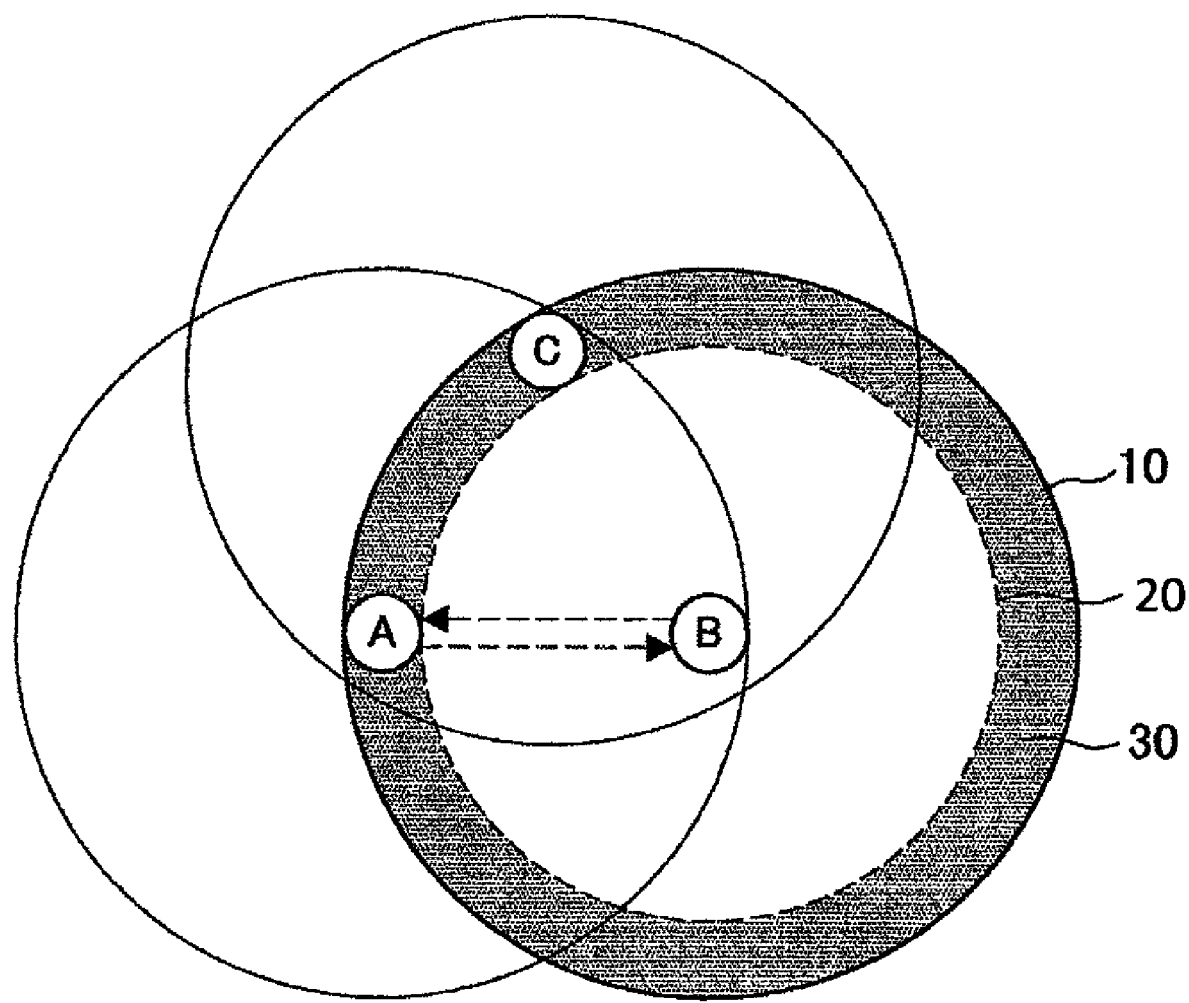
FIG. 14 is an explanatory view to explain a difference in signal reachability between broadcast communication and unicast communication.

In the communication management method of the wireless communication system according to the embodiment, the receiving node receives ACK that is transmitted via unicast from the transmitting node as the third step. The processing in the third step is described hereinafter with reference to FIGS. 11 and 12. FIG. 11 is an explanatory view showing the configuration of a wireless network in the third step. FIG. 12 is a flowchart showing the processing in the receiving node that receives a unicast hello ACK message.

The transmitting node that has received the unicast hello message transmits a unicast hello ACK message to the receiving node that has transmitted the unicast hello message. The case where the node A that has transmitted the unicast hello message to the nodes B, C and D receives the unicast hello ACK message from the nodes B, C and D as shown in FIG. 11 is described hereinafter as an example.

The unicast hello ACK message may also have a typical message format as shown in FIG. 4. For example, a message in which the message type 191 is "unicast hello ACK", the address 194 indicating the transmission source of the message is its own address, and the hop limit 195 is "1" can be treated as a unicast hello ACK message. Further, the hello reception rate that is calculated by the above Expression 1 is set to the message body 198.

The message size of the unicast hello ACK message may correspond to the size S, M, L of the unicast hello message transmitted from the node A or it may be set to the smallest possible size. The former is applied to the case of accurately determining the two-way link quality in the link from the node A to the node B and the link from the node B to the node A, for example. On the other hand, the latter is applied to the case of placing a greater importance on determining the one-way link quality in the link from the node A to the node B, for example. In the following description, the former is applied, so that the unicast hello message and the unicast hello ACK message have the same size.

Referring to FIG. 12, the receiving node to receive the unicast hello ACK message first transmits the unicast hello message to the transmitting node (S200) and waits to receive the unicast hello ACK message from the transmitting node to which the unicast hello message has been transmitted (S202). The receiving node of the unicast hello ACK message waits for a prescribed time (which is referred to hereinafter as the "ACK waiting time"), for example. Thus, the receiving node of the unicast hello ACK message waits to receive the unicast hello ACK message until the ACK waiting time elapses and, when the ACK waiting time has elapsed, the receiving node executes the next processing (S204). The ACK waiting time may be set to about 3 seconds, for example.

If the ACK waiting time has elapsed, the receiving node of the unicast hello ACK message determines whether or not it has received the unicast hello ACK message (S206). If the receiving node has received the unicast hello ACK message, it sets a nearby node list for the node (S208). If, on the other hand, the receiving node has not received the unicast hello ACK message, it excludes the node from a target for which the nearby node list is set (S210). Further, if the receiving node receives the unicast hello ACK message after the ACK waiting time has elapsed, it excludes the node that has transmitted the unicast hello ACK message from a target for which the nearby node list is set. The receiving node generates the nearby node list in this manner.

The receiving node that has received the unicast hello ACK message according to the flowchart of FIG. 12 then calculates various statistical information from TLV described in the message body of the unicast hello ACK message. For example, the receiving node may calculate a round-trip time (RTT) from the hello transmission time and the ACK reception time and further calculate a reception interval by comparing the calculated RTT with RTT in the previous ACK reception.

FIG. 13 shows an example of the nearby node list after receiving the unicast hello ACK message. It is assumed that the node B and the node C exist in the nearby area of the receiving node of the unicast hello ACK message. The nearby node list shown in FIG. 13 is stored in the nearby node list storage portion 180 of FIG. 2. For example, an address 181 of the node that has transmitted the unicast hello ACK message, a received signal strength indicator (RSSI) 182, a hello reception rate 183, a hello message reception interval 184, a transmission rate 185 and a RTT 186 are stored in association with each other on the nearby node list.

The RSSI 182 is provided by a wireless LAN device, and information about a received packet can be generally acquired there from. As the hello reception rate 183, information about the three sizes (S, M, L) of the hello message and the average (H) of those calculated by Expression 1 may be retained. It is thereby possible to grasp which size of message has high reachability. Further, the hello reception rate 183 may be calculated for each of two kinds: the unicast hello message (forward direction) and the unicast hello ACK message (reverse direction). It is thereby possible to grasp a difference in the reachability of messages between the forward direction and the reverse direction. The reception interval 184 that indicates the reception interval of hello messages corresponds to the communication management interval. Thus, when the communication management interval is one second, the reception interval 184 is also one second, though a slight error occurs as shown in FIG. 13.

The statistical information that is held on the nearby node list generated in this manner serves as a material to determine as to whether suitable communication is actually possible, and it can be used as a criterion of judgment on routing by a routing protocol or the like. If the nodes that transmit the broadcast hello message are merely registered on the nearby node list as it has been in a technique heretofore used, there is a possibility that the node that fails to communicate actual data would be also registered on the nearby node list. On the other hand, according to this embodiment, the receiving node that has received the broadcast hello message, which is a first communication management signal, transmits the unicast hello message, which is a second communication management signal, to the transmitting node. Then, the receiving node receives the unicast hello ACK message, which is an acknowledge signal in response to the unicast hello message, thereby registering the node onto the nearby node list. Because a data signal is transmitted and received in a data transfer period after confirming that a signal has reached by broadcast communication and unicast communication, it is possible to appropriate grasp the communication relationship between the nodes.

Further, in a technique heretofore used, a link quality is measured using the hello message via broadcast to increase efficiency. However, because actual communication is usually performed by unicast communication, a result measured in broadcast communication does not serve as a reference in unicast communication. On the other hand, according to the embodiment, unicast communication that is used in actual communication is used for measurement of a link quality, thereby accurately determining the link state between nodes. This enables stable routing selection by a routing protocol.

Furthermore, a hello message heretofore used is not only transmitted by broadcast communication but also has a fixed, short packet size. A message with a small packet size generally has a low error rate and a low loss rate, and if the reception rate of such a hello message is used as a reference, it may fail to accurately determine the link state between nodes. On the other hand, according to this embodiment, the packet size of the hello message is variable and the reception rate is measured statistically, thereby enabling accurate determination on the link state.

Such a measurement of a link quality using the unicast hello message in this embodiment may be used in combination with a traditional scheme using the broadcast hello message. Further, it may be used in combination with RSSI indicating wireless electric field strength, thereby enabling more accurate determination on the link state.

It should be understood by those skilled in the art that various modifications, combinations, sub-combinations and alterations may occur depending on design requirements and other factors insofar as they are within the scope of the appended claims or the equivalents thereof.

For example, although the node from which the receiving node has received the broadcast hello message once is registered onto the candidate list in the above-described embodiment, the present invention is not limited thereto. For example, the node may be registered onto the candidate list only when the receiving node has received the broadcast hello message twice in succession.

Further, although the receiving node that has received the broadcast hello message generates the candidate list for each communication management interval and transmits the unicast hello message in the above-described embodiment, the present invention is not limited thereto. For example, the receiving node may transmit the unicast hello message each time a prescribed number (e.g. two) of communication management intervals have elapsed.

What is claimed is:

1. A wireless communication terminal forming a wireless network with a plurality of other wireless communication terminals, comprising:
    a wireless communication portion configured to detect a first communication management signal, the first communication management signal being periodically transmitted via broadcast from at least one of the other wireless communication terminals prior to communication of a data signal; and
    a candidate list generation portion configured to generate a candidate list for managing a destination of a second communication management signal, the candidate list comprising a plurality of candidate destinations, and the candidate list generation portion being further configured to define a transmission source of the first communication management signal as one of the candidate destinations; and
    a communication control portion configured to:
        identify at least one destination wireless communications terminal from the candidate destinations; and
        determine whether to transmit the second communication management signal to the at least one destination wireless communication terminal, based on a detection status of the first communication management signal; and
    wherein the wireless communications portion is further configured to:
        transmit the second communication management signal via unicast to the destination wireless communication terminal, based on the determination; and
        receive an acknowledge signal in response to the second communication management signal transmitted via unicast.

2. The wireless communication terminal according to claim 1, wherein the candidate list generation portion is further configured to:
    determine whether a predetermined number of the first communications management signals are received from the transmission source in succession; and
    exclude the transmission source from the candidate list, when the predetermined number of the first communications management signals have not been received in succession.

3. The wireless communication terminal according to claim 1, wherein:
    the candidate list further comprises remaining periods of time associated with the candidate destinations, the remaining time periods indicating time periods during which corresponding ones of the candidate destinations remain within the candidate list, and
    the candidate list generation portion is further configured to exclude one or more of the candidate destinations having remaining time periods of zero from the candidate list.

4. The wireless communication terminal according to claim 1, wherein a message length of the second communication management signal is variable.

5. The wireless communication terminal according to claim 1, wherein the second communication management signal is composed of one or two or more signals with different sizes.

6. The wireless communication terminal according to claim 5, further comprising:
a transmission form determination portion configured to determine a transmission form of the second communication management signal,
wherein the communication control portion is further configured to:
identify a plurality of destination wireless communications terminals from the candidate destinations; and
generate an instruction to transmit the second communication management signal to the plurality of destination wireless communications terminals based on the determined transmission form.

7. The wireless communication terminal according to claim 6, wherein the communication control portion is further configured to generate an instruction to transmit the second communication management signal to the plurality destinations wireless communications terminals in accordance with a size of the second communication management signal.

8. The wireless communication terminal according to claim 6, wherein the communication control portion is further configured to generate an instruction to transmit the second communication management signal to the plurality of destination wireless communications terminals based on corresponding identities of the destination wireless communications terminals.

9. The wireless communication terminal according to claim 6, wherein the communication control portion determines a priority for transmitting the second communication management signal to the plurality of destination wireless communications terminals, based on the detection status of the first communication management signal.

10. The wireless communication terminal according to claim 1, wherein:
the acknowledge signal contains a reception rate of the second communication management signal in the destination wireless communication terminal; and
the communication control portion is further configured to perform communication of a data signal based on the reception rate of the second communication management signal.

11. A wireless communication system comprising:
a first wireless communication terminal configured to periodically transmit a first communication management signal via broadcast prior to communication of a data signal the first wireless communications terminal comprising a first wireless communication portion configured to:
transmit the first communication management signal via broadcast;
receive a second communication management signal from a second wireless communication terminal that received the first communication management signal; and
transmit, to the second wireless communication terminal, an acknowledge signal via unicast in response to the second communication management signal,
wherein the second wireless communication terminal is configured to receive the first communication management signal and comprises:
a second wireless communication portion configured to detect the first communication management signal;
a candidate list generation portion configures to generate a candidate list for managing a destination of the second communication management signal, the candidate list comprising a plurality of candidate destinations, and the candidate list generation portion being further configured to define the first wireless communications terminal as one of the candidate destinations; and
a communication control portion configured to:
identify at least one destination wireless communications terminal from the candidate destinations, the at least one destination wireless communications terminal comprising the first wireless communications terminal; and
determine whether to transmit the second communication management signal, based on a detection status of the first communication management signal;
wherein the second wireless communications portion is further configured to:
transmit the second communication management signal via unicast to the at least one destination wireless communication terminal, based on the determination; and
receive an acknowledge signal from the first wireless communication terminal.

12. A communication management method in a wireless communication system where a wireless network is formed by a plurality of wireless communication terminals, comprising the steps of:
detecting a first communication management signal, the first communications management signal being periodically transmitted via broadcast from at least one of the wireless communication terminals prior to communication of a data signal;
generating a candidate list for managing a destination of a second communication management signal, the candidate list comprising a plurality of candidate destinations, and the candidate list generation portion being further configured to define a transmission source of the first communication management signal as one of the candidate destinations;
identifying at least one destination wireless communications terminal from the candidate destinations;
determining whether to transmit a second communication management signal to the at least one destination wireless communication terminal, based on a detection status of the first communication management signal;
transmitting the second communication management signal via unicast to the at least one destination wireless communication terminal, based on the determination; and
receiving an acknowledge signal via unicast from the at least one destination wireless communication terminal having received the second communication management signal.

13. A computer non-transitory computer-readable medium storing instructions that, when executed by a processor, cause the processor to perform a method, comprising:
detecting a first communication management signal periodically transmitted via broadcast from a source wireless communication terminal prior to communication of a data signal;
generating a candidate list for managing a destination of the second communication management signal, the candidate list comprising a plurality of candidate destina tions, and the candidate list generation portion being further configured to define the source wireless communication terminal as one of the candidate destinations;

identifying at least one destination wireless communications terminal from the candidate destinations;

determining whether to transmit a second communication management signal to the at least one destination wireless communication terminal, based on a detection status of the first communication management signal;

transmitting the second communication management signal via unicast to the at least one destination wireless communications terminal, based on the determination; and receiving an acknowledge signal in response to the second communication management signal transmitted via unicast.

* * * * *